(12) United States Patent
Hansen (10) Patent No.: US 11,041,221 B2
(45) Date of Patent: Jun. 22, 2021

(54) METHODS AND PROCESSES OF FORMING GEARS

(71) Applicant: Sikorsky Aircraft Corporation, Stratford, CT (US)

(72) Inventor: Bruce D. Hansen, Shelton, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 0 days.

(21) Appl. No.: 16/600,775

(22) Filed: Oct. 14, 2019

(65) Prior Publication Data

US 2020/0040414 A1 Feb. 6, 2020

Related U.S. Application Data

(62) Division of application No. 15/546,452, filed as application No. PCT/US2016/014834 on Jan. 26, 2016, now Pat. No. 10,494,687.

(Continued)

(51) Int. Cl.
| | |
|---|---|
| *C21D 1/06* | (2006.01) |
| *C21D 7/06* | (2006.01) |
| *C21D 9/32* | (2006.01) |
| *F16H 55/06* | (2006.01) |
| *C23C 8/80* | (2006.01) |
| *C23C 8/22* | (2006.01) |
| *C23C 8/20* | (2006.01) |

(52) U.S. Cl.
CPC ............... *C21D 1/06* (2013.01); *C21D 7/06* (2013.01); *C21D 9/32* (2013.01); *C23C 8/20* (2013.01); *C23C 8/22* (2013.01); *C23C 8/80* (2013.01); *F16H 55/06* (2013.01); *C21D 2261/00* (2013.01)

(58) Field of Classification Search
CPC .... C21D 1/06; C21D 9/32; C21D 7/06; C23C 8/20; C23C 8/80; C23C 8/22; F16H 55/06
See application file for complete search history.

(56) References Cited

U.S. PATENT DOCUMENTS

| | | |
|---|---|---|
| 5,019,182 A | 5/1991 | Arimi |
| 6,610,154 B2 | 8/2003 | Limoges et al. |

(Continued)

FOREIGN PATENT DOCUMENTS

CN 102699644 A 10/2012

OTHER PUBLICATIONS

Breuer, D., and B. Matlock. "Adaptation of shot peen parameters for gear geometry." 11th International conference on shot peening (ICSP-11), South Bend. 2011.*

(Continued)

*Primary Examiner* — Jessee R Roe
(74) *Attorney, Agent, or Firm* — Michael Best & Friedrich LLP (57) ABSTRACT

A method of manufacturing a part is provided. The method includes heating a gear in the presence of carbon to carburize a material of the gear to create a carburized gear, the gear having a plurality of gear teeth and which comprises a selected material. Next, the carburized gear is high pressure gas quenched to drive the carbon into the material of the gear to create a quenched gear. Next, the quenched gear is at least one of cavitation peened and laser peened to create a peened gear. Finally, superfinishing is performed on surfaces of the peened gear.

19 Claims, 5 Drawing Sheets

Related U.S. Application Data

(60) Provisional application No. 62/111,933, filed on Feb. 4, 2015.

(56) References Cited

U.S. PATENT DOCUMENTS

| | | |
|---|---|---|
| 6,629,906 B1 | 10/2003 | Chiba et al. |
| 8,246,477 B2 | 8/2012 | Downey et al. |
| 8,801,872 B2 | 8/2014 | Wright et al. |
| 2005/0279430 A1 | 12/2005 | Hoffman et al. |
| 2006/0118209 A1 | 6/2006 | Edenhofer |
| 2013/0146180 A1 | 6/2013 | Kubota |

OTHER PUBLICATIONS

International Search Report and Written Opinion; International Application No. PCT/US2016/014834; International Filing Date: Jan. 26, 2016; dated Apr. 1, 2016; 14 Pages.

\* cited by examiner

METHODS AND PROCESSES OF FORMING GEARS

CROSS REFERENCE TO RELATED APPLICATIONS

This application is Divisional Application of U.S. Non-Provisional application Ser. No. 15/546,452, now U.S. Pat. No. 10,494,687, filed Jul. 26, 2017, which is a National Stage application of PCT/US2016/014834, filed Jan. 26, 2016, which claims the benefit of U.S. Provisional Application No. 62/111,933, filed Feb. 4, 2015, each of which are incorporated by reference in their entirety herein.

BACKGROUND OF THE INVENTION

The subject matter disclosed herein generally relates to methods of forming gears and, more particularly, to a method and process of forming an improved gear.

Gears are used in various industrial and technological applications to permit power transmission from one rotating or translating element to another. Each gear generally includes an array of gear teeth that mesh with the gear teeth of another gear so that the rotation or translation of the first gear can be transmitted to the second gear.

Existing gears may be heavy, and in aircraft applications, the weight of the gears may impact and/or limit the payload capability and/or range of the aircraft. Previous attempts to lighten the weight of gears resulted in gears that were not sufficiently robust to operate under operational conditions. For example, the technique of shot peening has been applied to the surfaces of the gears in order to produce a compressive residual stress layer and further modify the structural properties of the materials that formed the gears. However, shot peening resulted in a depth of impact to about 0.002 inches (0.005 cm) deep, which failed to provide sufficient robustness and improved strength to the material.

BRIEF DESCRIPTION OF THE INVENTION

According to one embodiment, a method of manufacturing a part is provided. The method includes heating a gear in the presence of carbon to carburize a material of the gear to create a carburized gear, the gear having a plurality of gear teeth and which comprises a selected material, high pressure gas quenching the carburized gear to drive the carbon into the material of the gear to create a quenched gear, at least one of cavitation peening and laser peening surfaces of the quenched gear to create a peened gear, and superfinishing surfaces of the peened gear.

In addition to one or more of the features described above, or as an alternative, further embodiments may include, wherein the heating and the high pressure gas quenching are performed in a single apparatus without removing the gear from the single apparatus.

In addition to one or more of the features described above, or as an alternative, further embodiments may include, wherein the at least one of cavitation peening and laser peening generates a layer of induced compressive stresses that is about 0.010 inches (0.025 cm) or thicker.

In addition to one or more of the features described above, or as an alternative, further embodiments may include, wherein the surfaces of the gear that are subject to the superfinishing are contact surfaces of the plurality of gear teeth.

In addition to one or more of the features described above, or as an alternative, further embodiments may include, wherein the superfinishing generates a surface roughness between about 1 RA and about 4 RA.

In addition to one or more of the features described above, or as an alternative, further embodiments may include, wherein the superfinishing generates a surface roughness between about 1 RA and about 2 RA.

In addition to one or more of the features described above, or as an alternative, further embodiments may include, wherein the carburization hardens the material at about 60 HRC to a depth of about 0.020 inches (0.051 cm) or greater.

In addition to one or more of the features described above, or as an alternative, further embodiments may include, wherein the carburization hardens the material at about 55 HRC to a depth of between about 0.020 inches (0.051 cm) and about 0.060 inches (0.152 cm).

In addition to one or more of the features described above, or as an alternative, further embodiments may include, wherein the high pressure gas quenching employs non-reactive gas for quenching.

According to another embodiment, a gear is provided that is manufactured according to the above method(s).

According to another embodiment, a gear is provided. The gear includes a gear body defining a circle and an outer surface and formed from a selected material and a plurality of gear teeth extending from the outer surface of the gear body. Each tooth of the plurality of gear teeth has a tip and a tooth surface. Each tooth has a carburized portion extending to a first depth from the tooth surface, a peened portion extending to a second depth, and a superfinished portion extending to a third depth.

In addition to one or more of the features described above, or as an alternative, further embodiments may include, wherein second depth is less than the first depth, and the third depth is less than the second depth.

In addition to one or more of the features described above, or as an alternative, further embodiments may include, wherein the second depth is about 0.010 inches (0.025 cm) from the tooth surface.

In addition to one or more of the features described above, or as an alternative, further embodiments may include, wherein the third depth defines a surface roughness of the tooth surface between about 1 RA and about 4 RA.

In addition to one or more of the features described above, or as an alternative, further embodiments may include, wherein the carburized portion defines a hardness of about 60 HRC to a depth of about 0.020 inches (0.051 cm) or greater.

In addition to one or more of the features described above, or as an alternative, further embodiments may include, wherein the carburized portion defines a hardness of about 55 HRC to a depth of between about 0.020 inches (0.051 cm) and about 0.060 inches (0.152 cm).

In addition to one or more of the features described above, or as an alternative, further embodiments may include, wherein the first depth is about 0.020 inches (0.051 cm) to about 0.060 inches (0.152 cm), the second depth is about 0.010 inches (0.025 cm) or more, and the third depth is about 0.0001 inches (0.0003 cm).

Technical features of the invention include a process of forming a gear with improved strength while maintaining a low weight through the application of carburization, high pressure gas quenching, cavitation peening, and superfinishing of the material during the gear manufacturing processes.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION OF THE INVENTION

In transmission design, such as for aircraft, transmission weight reduction is of considerable importance. Thus, because the gears inside a transmission are normally the heaviest components in a drive system, reducing gear size and numbers of gears can be useful in reducing transmission weight and volume. Alternatively, forming the gears from lightweight materials that retain high material strength and robustness may provide a solution without the need to change other elements of a transmission system due to changes in size/number of gears, etc., as results from other solutions for weight reduction. The shapes of the gear teeth can be varied with some gear teeth being linearly shaped, some being helically shaped, and other being provided as double-helical or herringbone shaped, face gear, and still other being provided as arcuate shaped (or C-Gear) gear teeth.

Figure 1:
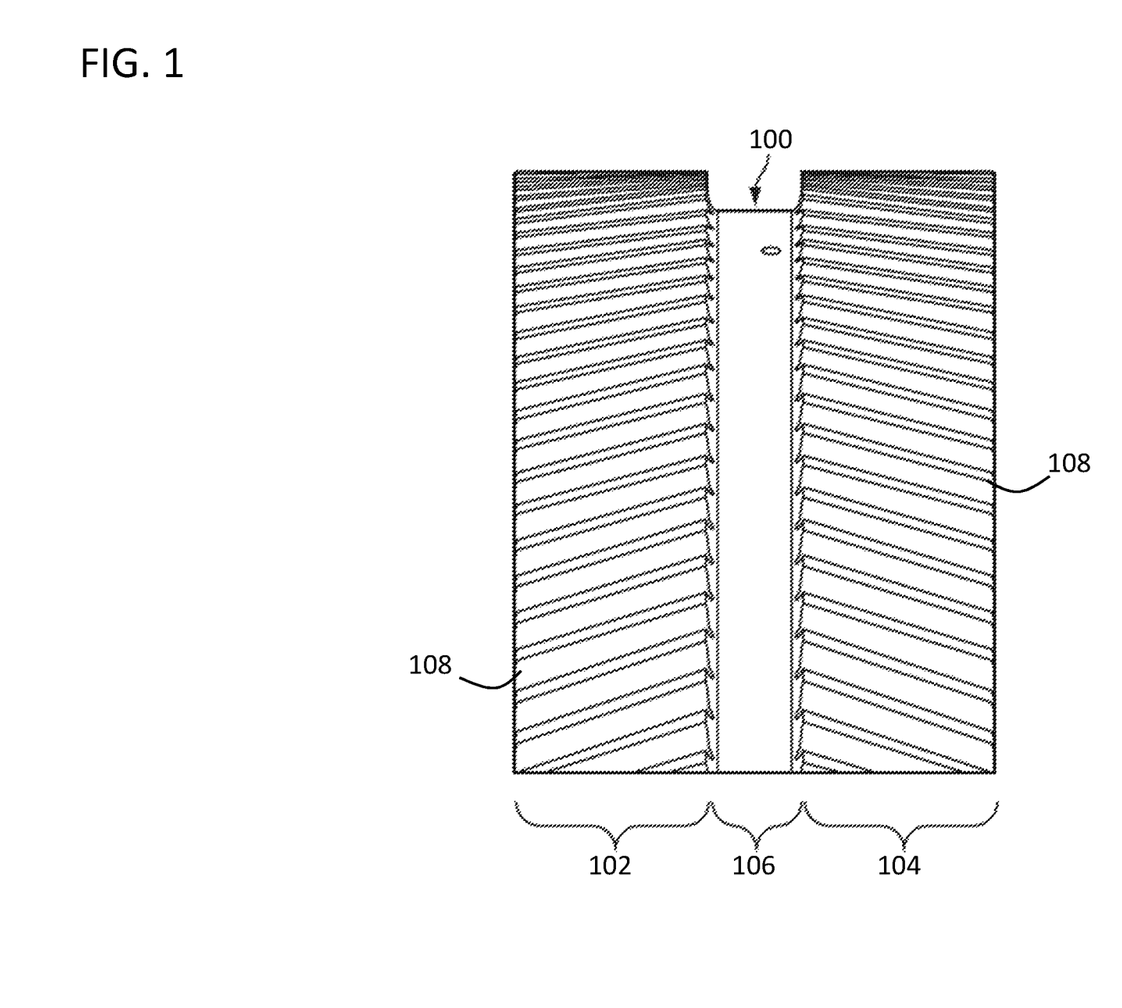
FIG. 1 is a schematic view of a double helical gear with an apex gap, showing an exemplary gear having gear teeth.

With reference to FIG. 1, an exemplary gear, such as conventional double helical gear 100, is shown. The double helical gear 100 includes a first side 102 having a helical gear pattern of gear teeth 108, a second side 104 having a helical gear pattern of gear teeth 108 opposite the first side 102, and an apex gap 106 defined axially between the first side 102 and the second side 104. Each of the first side 102 and the second side 104, of the double helical gear 100, include a plurality of gear teeth 108.

The double helical gear 100 has a relatively high gear contact ratio owing to the presence of the helical gear patterns of the first side 102 and the second side 104. As a result, a gear mesh of the double helical gear 100 exhibits increased strength and reduced noise signature as compared to that of a straight spur gear. The apex gap 106 is formed as a result of processes used to shape and precision grind the gear flanks and roots of the helical gear teeth 108. The apex gap 106 may add a considerable weight and size penalty to an overall transmission system in which the double helical gear 100 resides. While shown with an apex gap 106, it is understood that the apex gap 106 is not required in all aspects, e.g., first side 102 and second side 104 may connect or form a continuous surface of teeth 108.

Thus, it is desirable to form gears, such as gear 100, out of lightweight materials but also retain strong structural properties to operate efficiently and effectively within a transmission, such as within an aircraft transmission. Those of skill in the art will appreciate that the gear 100 of FIG. 1 is merely an exemplary gear, and other types of gears may be formed by the processes disclosed herein, without departing from the scope of the invention. For example, the processes disclosed herein may be used for forming straight spur gears, bull gears, bevel gears, input gears, output gears, transfer gears, spur gears, etc. Further, two sets of teeth, as shown in FIG. 1, are not a requirement for the gears formed by the processes described herein. For example, a gear may include a single set of gear teeth and/or the gear teeth may cover an entire periphery surface and/or circumference of the gear. In other embodiments, more than two sets of teeth may be formed by the processes disclosed herein. Further, for example, the shapes of the gear teeth can be varied with some gear teeth being linearly shaped, some being helically shaped, and others being provided as double-helical or herringbone shaped, and still others being provided as arcuate shaped (or C-Gear) gear teeth, without departing from the scope of the invention.

Figure 2:
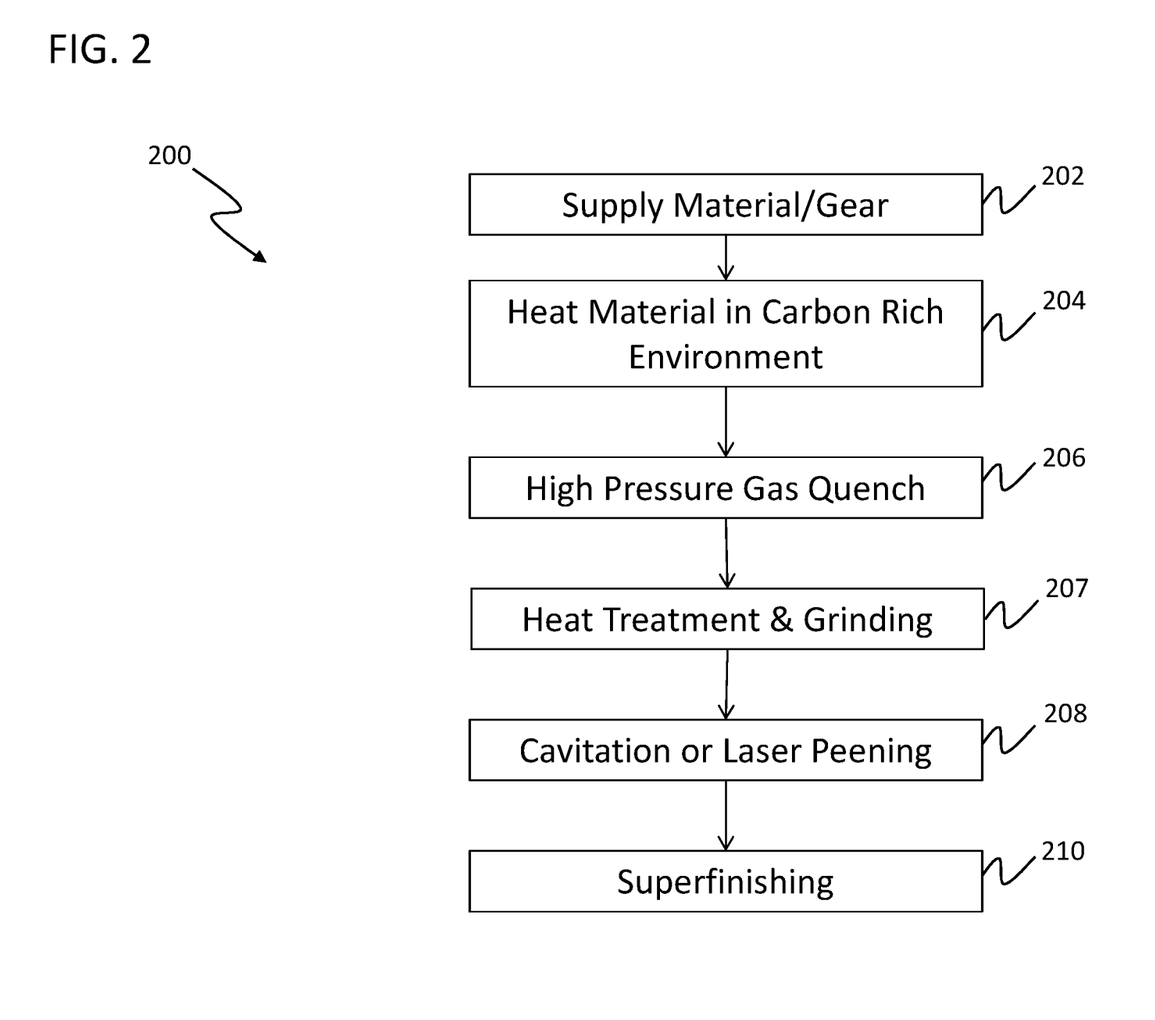
FIG. 2 is an exemplary process of forming and/or manufacturing a gear in accordance with an exemplary embodiment of the invention.

With reference now to FIG. 2, a process 200 for forming a gear in accordance with an exemplary embodiment of the invention is shown. At step 202, a material for the gear is provided for processing. The material may be provided already machined into the shape of the gear (including gear teeth), and may be a material that may not be strong enough in the supplied state to adequately function as a gear or as a gear for an intended purpose. For example, the material may require additional hardness and/or strength to function as a gear. However, the process 200 is configured to treat the material to increase the structural strength and material properties of the gear to improve the gear. As such, materials that have a hardness that is not adequate for gear purposes may be employed when the process 200 is used. Further, materials that are traditionally used for gears may be used, with the process 200 providing improved life for the processed gears.

In one exemplary embodiment, the gear is formed from Questek's Ferrium C64® (AMS 6509). This material provides high strength, high toughness, high hardness, and is carburizable. In other embodiments, the gear may be formed from Pyrowear® Alloy 53 and 675 which are carburizable steels possessing good temper resistance and high strength and hot hardness while maintaining high core impact strength and fracture toughness. These are merely exemplary materials that may be used as a base or starting material for the gears that are formed in accordance with embodiments of the invention. Those of skill in the art will appreciate that other materials may be used without departing from the scope of the invention.

At step 204, the gear is heated in an oven in the presence of carbon, e.g., heated in a carbon rich environment, such as acetylene. For example, a heating oven may be provided with a source of carbon that is supplied to or within the heating chamber of the oven. The carbon-rich environment, employed at step 204, enables or causes the gear to be carburized. The carburization process drives the carbon into the material of the gear, thus providing a high content of carbon on the exterior surfaces of the gear. Carburization step 204 may be a low pressure carburization process that is maintained under a tight control process. While not required in all aspects, the heating can be performed between about 1472° F./800° C. and about 2192° F./1200° C. while the gear is carburized. In some embodiments, the heating may occur at about 1832° F./1000° C. Those of skill in the art will appreciate that other temperatures, either higher or lower, may be used without departing from the scope of the invention. For example, the temperature used during the carburization step 204 may be dependent in part on the material used to form the gear and also depending on sufficient and/or efficient absorption of the carbon by the material of the gear, e.g., good absorption in the grains of the material and not at the grain boundaries.

The heated and carburized gear is then high pressure gas quenched at step 206. The high pressure gas quenching of step 206 employs a non-reactive gas, such as nitrogen, to rapidly cool down the gear. The high pressure gas quenching of step 206 may be performed in the same oven or chamber that the heating and carburization of step 204 occurs. In some embodiments, the high pressure gas quenching step 206 may be performed on the order of seconds, such that the temperature is brought quickly down from the carburization temperature to about room temperature in about ten seconds. This is merely provided for an example, and the timing of the quenching and/or the quenching temperature may be varied without departing from the scope of the invention. Advantageously, the high pressure gas quenching of step 206 may provide minimal distortion and reduce costs as compared to other types of quenching. While not required in all aspects, the high pressure gas quenching pressurization may be performed at about 2 bar or greater, and in some embodiments, may be performed at 5-10 bar or greater. Those of skill in the art will appreciate that other pressures may be used without departing from the scope of the invention.

After quenching at step 206, heat treatment and grinding may be performed at step 207. During step 207, the heat treatment may include subzero cooling and tempering. Further, during step 207, the grinding may be a finish grinding process that is performed on the gear.

Next, cavitation and/or laser peening is performed at step 208. In some embodiments, the cavitation peening comprises directing a high velocity water jet through a nozzle toward surfaces of the gear, such as surfaces of the gear teeth, while the gear is submerged in water. The high velocity water jet forms cavitation bubbles within the water. The cavitation bubbles then impinge upon the surface of the gear to cause plastic deformation resulting in changes to the compressive stress of the surfaces of the gear. The change in compressive stress in the surface of the gear that is impacted by the cavitation peening process increases and/or extends the operational life of the gear. In alternative embodiments, laser peening can be performed at step 208 instead of or in addition to cavitation peening.

After the gear is subjected to the cavitation peening at step 208, the gear is subject to superfinishing at step 210. Superfinishing involves a treatment that is designed or configured to increase surface contact between teeth during operation of the gear. For example, the result of steps 202-208 will generate a gear having a plurality of gear teeth that has an increased operational life. However, the machining at or before step 202 and the later treatments in steps 204-208, leave the gear teeth of the gear with a relatively rough surface, having both peaks and valleys in the surface roughness. Superfinishing involves treating the surfaces of the gear such that the peaks of the surface roughness are eroded and/or reduced to form plateaus, leaving the valleys unaltered. The superfinishing results in smoother surface of the teeth of the gear, which results in an increase in surface area contact, and thus improves the contact between two gears during operation. While not required in all aspects, superfinishing can result in surface roughnesses between about 1 $R_a$ and about 4 $R_a$.

The end result of the process 200 is a gear with improved life and improved contact surfaces for efficiency. For example, when cavitation peening of step 208 is applied to the faces and flanks of the gear teeth, each tooth of the gear has a relatively soft tip which enables give or ductility, but the contact surfaces (faces/flanks) that have increased strength and/or hardness and provide increased surface area due to the superfinishing—resulting in increased life and improved efficiency of power transmission between gears.

Figure 3:
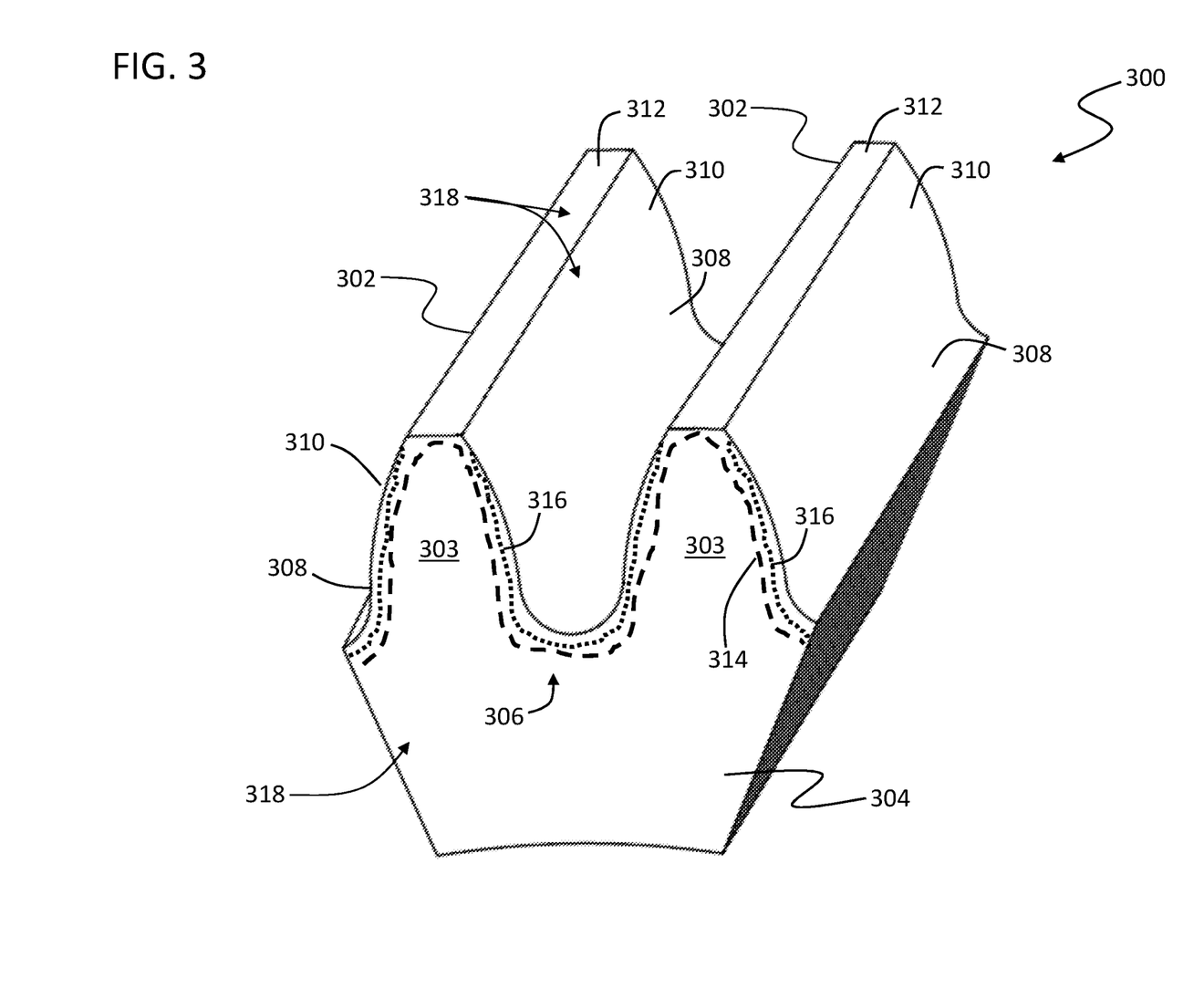
FIG. 3 shows exemplary gear teeth formed in accordance with embodiments of the invention.

Now turning to FIG. 3, exemplary teeth that have been processed accordingly to the process 200 of FIG. 2 are shown. Gear 300 includes two gear teeth 302 of the gear 300 formed in accordance with embodiments of the invention. The gear teeth 302 extend from a gear body 304 which defines a circle. Between the teeth 302 is a valley, bottom land, or root 306 which is proximal to or part of an outer surface or circumference of the gear body 304. Extending radially outward from the root 306, relative to the gear body 304, is a root radius 308 and tooth flanks 310 which then end at the top land or tip 312 of each tooth 302. As shown, tip 312 of teeth 302 is flattened as is known in the art for gear teeth.

During formation or manufacture, such as when employing process 200, the gear 300 is formed with a carburized layer 314 which is represented by the dashed line in FIG. 3. The carburized layer 314 extends from a surface of the material of each tooth to a depth represented by the dashed line of carburized layer 314. In some exemplary embodiments, the carburization may be to a depth of about 0.020 inches (0.051 cm) to about 0.060 inches (0.152 cm). In some cases, the top lands 312 and end faces 303 may be masked to reduce or eliminate the carburization depth at the top land 312 and end faces 303 of the teeth 302. For instance, as shown, the carburization depth is reduced to almost zero at a central portion of the land. As used herein, the term "about" is understood by those of ordinary skill in the art to mean a variation or variance of the provided values with a margin of error that is reasonable. For example, as understood by those of skill in the art, a margin of error may be within normal tolerances variances for the particular measurement or value.

After the carburization treatment, the step of cavitation peening is performed on the gear 300. The depth of the cavitation peening 316 is represented by the dotted line of cavitation peening 316 in FIG. 3. As shown, the depth of the cavitation peening 316 is less than the depth of the carburization layer 314. Thus, in some exemplary embodiments, the cavitation peening may be to a depth of about 0.010 inches (0.254 cm), or thicker/deeper, but in most cases less than the depth of carburization. Further, as shown, the cavitation peening 316 does not extend around and through the full tip 312 of each tooth 302, but rather extend along the root radius 308 and the tooth flanks 310. However, this is merely for exemplary purposes, and those of skill in the art will appreciate that the tips may be cavitation peened without departing from the scope of the invention.

Finally, in terms of the process 200 of FIG. 2, the gear 300 is superfinished. The tooth flanks 310, the top land 312, the bottom land 306, the root radius 308, and the end faces 303 of teeth 302 are superfinished. The superfinishing surface 318 is applied, in part, because after the cavitation peening step of the process, the surface finish of the tooth surfaces that are processed will have peaks and valleys formed therein. Accordingly, to improve the surface contact between two gears during operation, such as two gears 300, the surfaces of the root radius 308, tooth flanks 310, top land 312, bottom land 306, and end faces 303 are superfinished to remove or reduce the peaks on the surfaces and leave the valleys, resulting in a smoother surface finish (less surface roughness) than otherwise formed without the superfinishing process. In some embodiments, the superfinishing may achieve a surface roughness value of between about 1 $R_a$ and about 4 $R_a$.

Figure 4:
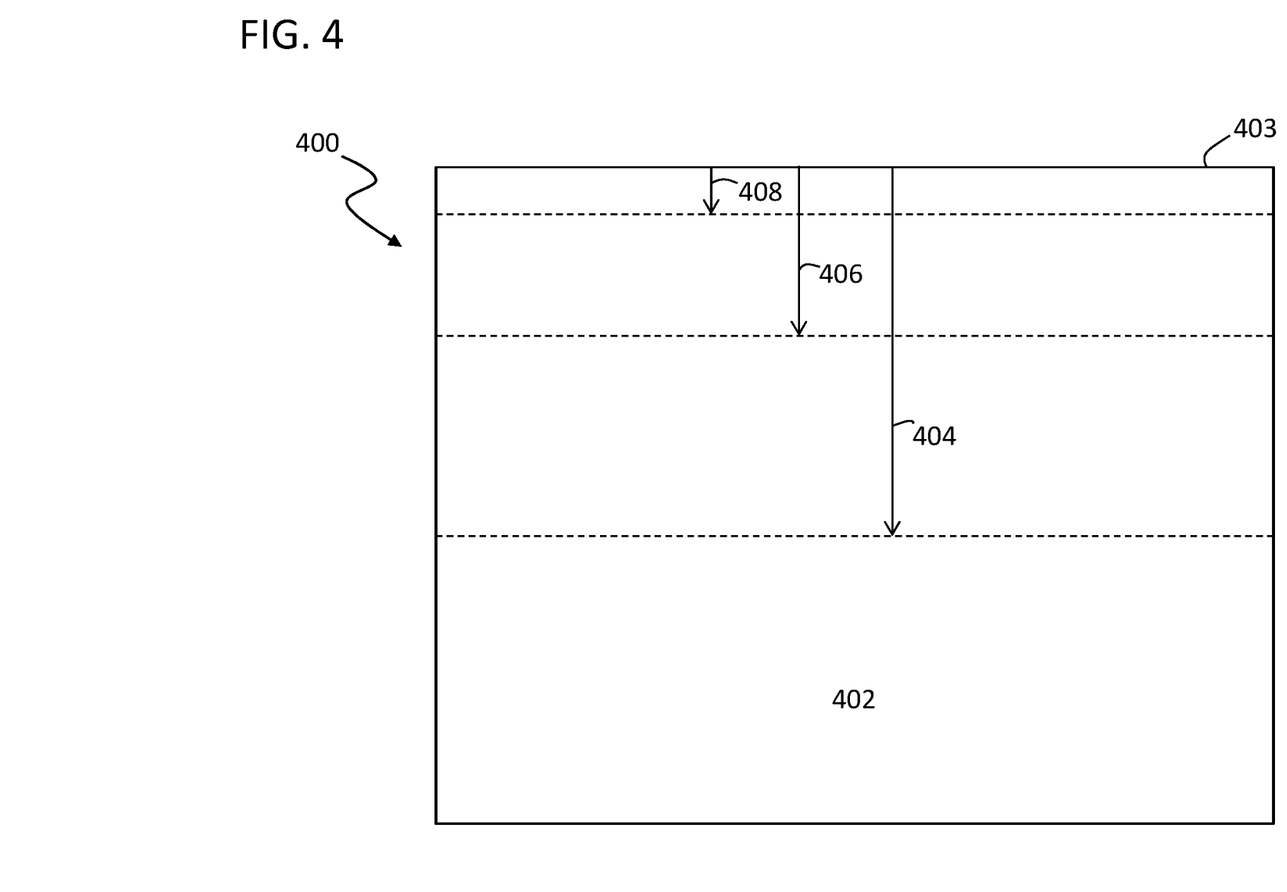
FIG. 4 is an exemplary cross-sectional view of a tooth showing material depths achieved by processes in accordance with exemplary embodiments of the invention.

Turning now to FIG. 4, a cross-sectional view of a tooth 400 processed in accordance with embodiments of the invention is shown. Tooth 400 includes a base or selected material 402 which is the base or starting material of the gear, as described above. FIG. 4 shows the relative depths from a tooth surface 403 of the various treatments of the processes of the invention. For example, selected material 402 has the characteristics of the selected material prior to treatment. Then, the carburization step of the process, which occurs during the gas quenching stage, carburizes or impacts the material to a first depth 404, and forms a carburized portion. Then, the cavitation peening impacts the selected material 402 to a second depth 406, which is less than the first depth 404, and forms a peened portion. Finally, the superfinishing is applied to the surface of the selected material 402 which impacts the material to a third depth 408 which is less than the second depth 406, and formed a superfinished portion. In an exemplary embodiment, the first depth 404 is about 0.020 inches (0.051 cm) to about 0.060 inches (0.152 cm), the second depth 406 is about 0.010 inches (0.025 cm) or more, and the third depth 408 is about 0.0001 inches (0.0003 cm), resulting in a surface roughness between about 1 $R_a$ and about 4 $R_a$.

Figure 5A:
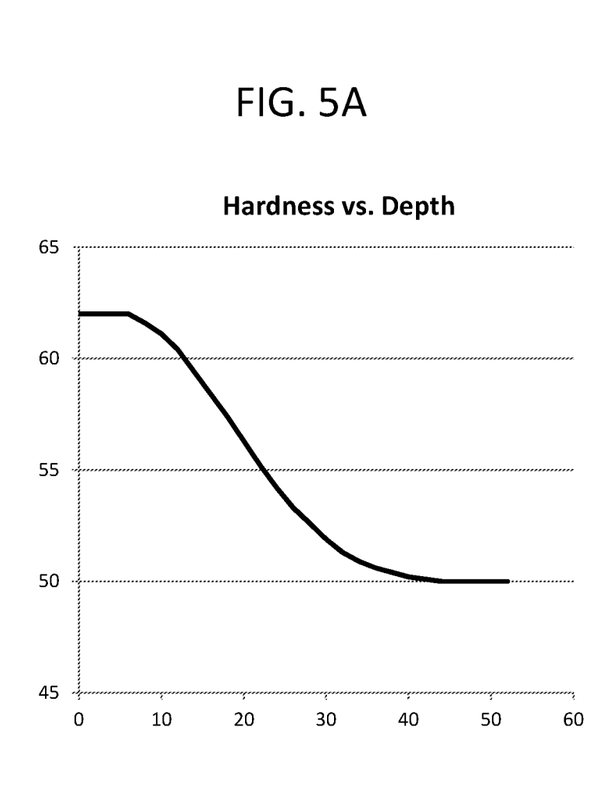
FIG. 5A is an exemplary plot of hardnesss versus depth of a material processed in accordance with exemplary embodiments of the invention.
Figure 5B:
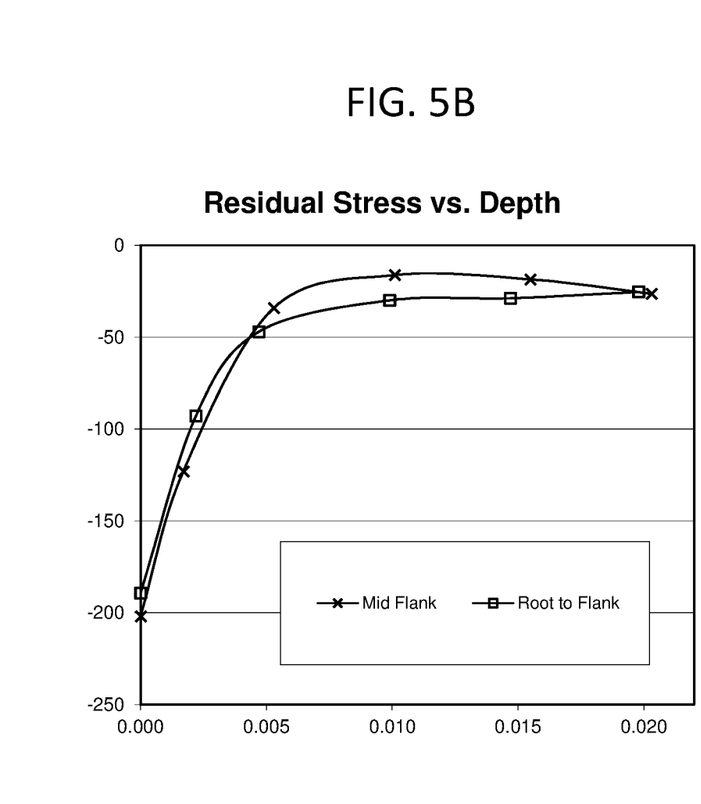
FIG. 5B is an exemplary plot of residual stress versus depth of a material processed in accordance with exemplary embodiments of the invention.

Turning now to FIGS. 5A and 5B, exemplary plots illustrating the hardness (FIG. 5A) and residual stress (FIG. 5B) of teeth formed in accordance with embodiments of the invention are shown. The horizontal axis of FIG. 5A is depth in 1/1000 inches and the vertical axis is hardness in Rockwell Hardness C Scale ("HRC"). The horizontal axis of FIG. 5B is depth in inches and the vertical axis is residual stress in kilopounds per square inch ("ksi").

With reference to FIG. 5A, the surface hardness of a gear tooth is about 62 HRC to a depth of about 0.010 inches (0.254 cm) and then drops to about 50 HRC. The increased hardness of about 62 HRC at the surface is provided, in part, by the carburization step of the above described process. Further, the increased, but decreasing hardness from about 0.010 inches (0.254 cm) to the core of the material is provided, in part, by the carburization process. After about 0.040 inches (0.102 cm) of depth, the normal or untreated hardness of about 50 HRC of the material is present.

With reference to FIG. 5B, exemplary values of the residual stress of the surfaces of the gear teeth at mid flank and root-to-flank are shown (see, e.g., FIG. 3). The mid flank values are represented by the "x" points and the line connecting the x point. The root-to-flank values are represented by the "square" points and the line connecting the square point. As shown, the residual strength is approximately −200 ksi at the surface of the material, and then increases to about −25 ksi at a depth of about 0.010 inches (0.025 cm).

Advantageously, in accordance with various embodiments of the invention, the process provides an improved strength and robustness to gear teeth of gears. Further, advantageously, the improved gears may be formed from materials that are relatively light-weight and thus reduce the weight of a transmission in, for example, aircraft applications.

Further, in accordance with some embodiments of the invention, the cavitation peening provides increased depth of penetration for improved stress and strength. For example, as noted above, the cavitation peening of the invention provides a depth of about 0.010 inches (0.254 cm). This is about four to five times as deep as prior techniques, such as shot peening, which is about 0.002 inches (0.051 cm) deep.

Further, advantageously, the process of superfinishing the gear teeth, in accordance with various embodiments of the invention, enables an improved contact surface for the teeth. Thus, efficiency and improved power transfer between gears may be achieved.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments and/or features.

For example, various exemplary depths of impact during the stages of processing during the manufacturing process are described herein. Those of skill in the art will appreciate that these depths are merely presented for illustrative and explanatory purposes, and the invention is not limited thereby. Further, as noted, various exemplary materials have been disclosed above. Those of skill in the art will appreciate that the material used in the processes described herein are not to be limited to those described above, and that any suitable materials for gear formation may be used without departing from the scope of the invention.

Accordingly, the invention is not to be seen as limited by the foregoing description, but is only limited by the scope of the appended claims.

What is claimed is:

1. A gear comprising:
a gear body defining a circle and an outer surface and formed from a selected material; and
a plurality of gear teeth extending from the outer surface of the gear body,
wherein each tooth of the plurality of gear teeth has a tip and a tooth surface, and
wherein each tooth has a carburized portion extending to a first depth from the tooth surface, a peened portion extending to a second depth, and a superfinished portion extending to a third depth, wherein the second depth is less than the first depth, and the third depth is less than the second depth.

2. The gear of claim 1, wherein the second depth is about 0.010 inches (0.025 cm) from the tooth surface.

3. The gear of claim 1, wherein the third depth defines a surface roughness of the tooth surface between about 1 RA and about 4 RA.

4. The gear of claim 1, wherein the carburized portion defines a hardness of about 60 HRC to a depth of about 0.020 inches (0.051 cm) or greater.

5. The gear of claim 1, wherein the carburized portion defines a hardness of about 55 HRC to a depth of between about 0.020 inches (0.051 cm) and about 0.060 inches (0.152 cm).

6. The gear of claim 1, wherein the first depth is about 0.020 inches (0.051 cm) to about 0.060 inches (0.152 cm), the second depth is about 0.010 inches (0.025 cm) or more, and the third depth is about 0.0001 inches (0.0003 cm).

7. The gear of claim 1, wherein the peened portion is formed by at least one of cavitation peening and laser peening.

8. A gear comprising:
a gear body defining a circle and an outer surface and formed from a selected material; and
a plurality of gear teeth extending from the outer surface of the gear body,
wherein each tooth of the plurality of gear teeth has a tip and a tooth surface, and
wherein each tooth has a carburized portion extending to a first depth from the tooth surface, a peened portion extending to a second depth, and a superfinished portion extending to a third depth, wherein the second depth is about 0.010 inches (0.025 cm) from the tooth surface.

9. The gear of claim 8, wherein the peened portion includes a layer of induced compressive stresses.

10. The gear of claim 8, wherein the peened portion is formed by at least one of cavitation peening and laser peening.

11. The gear of claim 8, wherein the third depth defines a surface roughness of the tooth surface between about 1 RA and about 4 RA.

12. The gear of claim 8, wherein the carburized portion defines a hardness of about 60 HRC to a depth of about 0.020 inches (0.051 cm) or greater.

13. The gear of claim 8, wherein the carburized portion defines a hardness of about 55 HRC to a depth of between about 0.020 inches (0.051 cm) and about 0.060 inches (0.152 cm).

14. The gear of claim 8, wherein the first depth is about 0.020 inches (0.051 cm) to about 0.060 inches (0.152 cm), the second depth is about 0.010 inches (0.025 cm) or more, and the third depth is about 0.0001 inches (0.0003 cm).

15. A gear comprising:
a gear body defining a circle and an outer surface and formed from a selected material; and
a plurality of gear teeth extending from the outer surface of the gear body,
wherein each tooth of the plurality of gear teeth has a tip and a tooth surface, and
wherein each tooth has a carburized portion extending to a first depth from the tooth surface, a peened portion extending to a second depth, and a superfinished portion extending to a third depth, wherein the third depth defines a surface roughness of the tooth surface between about 1 RA and about 4 RA.

16. The gear of claim 15, wherein the second depth is less than the first depth, and the third depth is less than the second depth, wherein the first depth is about 0.020 inches (0.051 cm) to about 0.060 inches (0.152 cm), the second depth is about 0.010 inches (0.025 cm) or more, and the third depth is about 0.0001 inches (0.0003 cm).

17. The gear of claim 15, wherein the carburized portion defines a hardness of about 60 HRC to a depth of about 0.020 inches (0.051 cm) or greater.

18. The gear of claim 15, wherein the carburized portion defines a hardness of about 55 HRC to a depth of between about 0.020 inches (0.051 cm) and about 0.060 inches (0.152 cm).

19. The gear of claim 15, wherein the peened portion is formed through at least one of cavitation peening and laser peening.

* * * * *